July 30, 1929. L. KIRSCHBRAUN 1,722,433
APPARATUS FOR MAKING EMULSIONS
Filed March 27, 1924
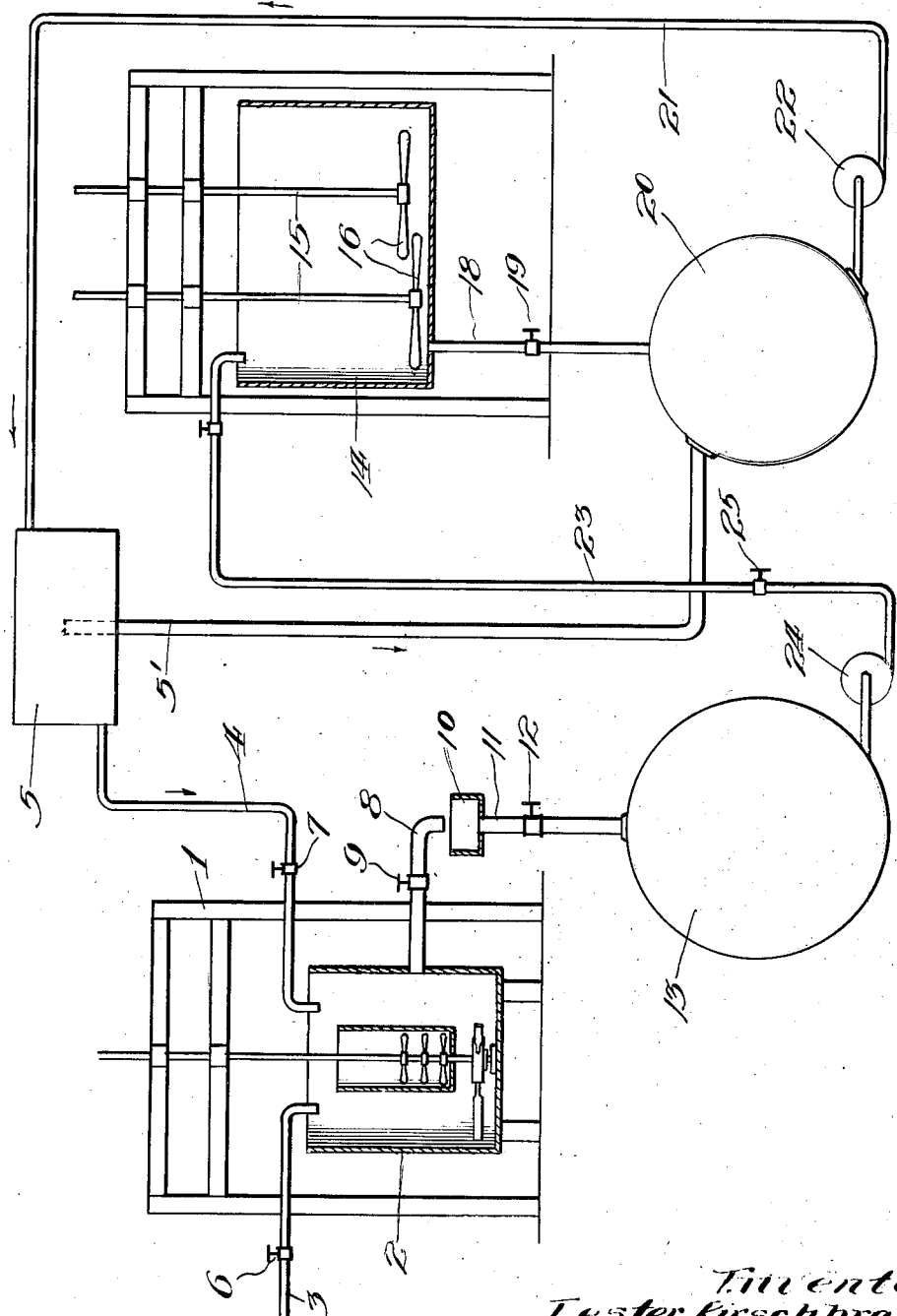
Inventor:
Lester Kirschbraun,
by Frank L. Belknap,
Atty.
Witness:
Stephen T. Rebora

Patented July 30, 1929.

1,722,433

UNITED STATES PATENT OFFICE.

LESTER KIRSCHBRAUN, OF CHICAGO, ILLINOIS.

APPARATUS FOR MAKING EMULSIONS.

Application filed March 27, 1924. Serial No. 702,318.

This invention relates to improvements in apparatus for making emulsions and refers more particularly to the apparatus for making a bituminous emulsion of bitumen, water and argillaceous emulsifying agents, such as colloidal clay, in which the bitumen forms the inernal phase of the emulsion. The idea of the present invention is to reduce the amount of clay used so that the proportion of bitumen or asphalt to clay will be at a maximum.

I have found in practice, in the production of my emulsions, that, with a given amount of asphalt, there is a minimum amount of water which must be used in order to obtain a satisfactory emulsion. At the same time, in order to make the proper emulsion, the suspension of clay and water must be sufficiently thick, having for example, a minimum viscosity of say upwards of 45 seconds by the Pennsylvania Railroad pipette. Accordingly, to keep the right amount of water and still have the clay suspension of sufficient viscosity, it may be necessary to add more clay than would be required for the amount of asphalt being used. The result is that a product is obtained having a lower amount of asphalt relative to the amount of clay than is desirable.

I have avoided this in the present invention by using a fixed minimum amount of clay and still maintaining the desired viscosity of the clay suspension by utilizing the solids of previously prepared emulsion to bring the mixture to the desired viscosity. Under ordinary operating conditions the clay suspension is prepared by charging a clay blunger with a predetermined amount of water and adding thereto clay in such quantities as will give the resulting suspension body or viscosity, which has been ascertained by previous trial. In the present invention however, the amount of clay which is employed is substantially reduced and the desired viscosity is obtained by supplementing the fresh clay used by solids contained in previously prepared emulsion the proportion of emulsion and water used in such case being so adjusted as to produce the total amount of liquid required for the suspension. It will be obvious, however, that if the previously prepared emulsion is sufficiently dilute to start with, no further addition of water may be required, and the desired solid contents and resulting viscosity may be obtained by adding dry clay to a sufficiently dilute suspension of the previously prepared emulsion in the blunger.

In order to more clearly appreciate the invention, it may be compared with the processes previously practiced by me. In these prior operations, 240 pounds of dry clay were placed in the blunger and made up with water to 80 gallons. When this clay was thoroughly suspended by the blunging action, the resultant suspension had a viscosity of 55 seconds by the Pennsylvania Railroad pipete, and each gallon of the suspension contained 3 pounds of clay. The clay used in the example cited, was a fair grade of pottery clay.

When this clay suspension was fed to the emulsifier and emulsified with as much asphalt as could be used to prepare a proper emulsion, 100 gallons of asphalt were required, this asphalt weighing at the temperature of 300 degrees Fahrenheit about 800 pounds. It is apparent, therefore, in the above instance, if the resulting emulsion, in which 80 gallons of clay suspension containing 240 pounds of clay, was emulsified with 100 gallons of asphalt comprising 800 pounds of asphalt, that the ratio of asphalt to clay in the final product was as 800 to 240, or 3.3 to 1.

By the present method, the clay blunger, instead of being charged with water, is charged with a previously prepared asphaltic emulsion which had been thinned so that it contained 2 pounds of asphalt per gallon of thinned emulsion. To this charge of thinned emulsion in the blunger may be added 1½ pounds of clay, which after a thorough blunging and mixing produced a new suspension having a viscosity in excess of 55 seconds by the Pennsylvania Railroad pipette. This new suspension, which comprises an admixture of solids, both asphalt and clay, is now used as the suspension with which additional hot asphalt is emulsified to produce fresh emulsion. In this newly prepared emulsion, approximately 90 gallons of suspension containing 1½ pounds of clay per gallon of suspension, or 135 pounds of clay in the total 90 gallons, was required to emulsify 100 gallons or 800 pounds of asphalt. The resulting emulsion in this case contained asphalt and clay in the proportion of 800 pounds of the former to 135 pounds of the latter, or a ratio of substantially 6 to 1.

Of course, in starting up the process, the ratio of asphalt to clay will approximate that obtained by the old method, as it is necessary to start in this way, but as the process proceeds and a portion of the emulsion is recycled in the manner described, the ratio of clay to asphalt is greatly reduced, until an equilibrium is established.

Instead of using previously prepared fresh emulsion from the storage tank with which to charge the blunger, I may use wasted emulsion, as for example such as is collected from screening or otherwise wasted about the plant. In such instance, if the amount of solids contained in such waste liquid is relatively low, the amount of clay required to maintain the desired viscosity of the clay suspension must naturally be increased.

Referring to the drawings, 1 designates a suitable framework in which is mounted an emulsifier 2 of any suitable type, as for example, that shown in the co-pending Kirschbraun and Overbury application, Serial No. 624,184. The asphalt in heated liquid condition is fed to the emulsifier through feed pipe 3, and the clay suspension through the feed pipe 4, from the supply box 5. Suitable throttle valves 6 and 7, respectively, are interposed in the pipes. The emulsion prepared in the emulsifier 2 is drawn off through the discharge pipe 8, controlled by valve 9, which discharge pipe delivers to a thinning box 10, in which water may be added to thin the emulsion. From the box 10, the emulsion passes through pipe 11, controlled by valve 12, to bulk supply storage tank 13.

Describing now the manner in which the clay suspension is made, a suitable blunger 14 is provided, having the revolving shafts 15 carrying the overlap paddle wheels or blades 16, the arrangement being such that the blades overlap but do not contact, and serve to effectively mix the contents in the blunger. The blunger is provided at its lower end with a drawoff pipe 18 having control valve 19, which pipe leads to a clay suspension tank 20 where a bulk supply of suspension is maintained. From the tank 20, this clay suspension is delivered through pipe 21, by means of pump 22, to the overhead feed box 5. The latter is provided with an overflow pipe 51' leading back to the tank 20. Arrangement is such that the clay suspension in the desired quantities can be at all times fed through the pipe 4 by controlling the valve 7. At the same time clay suspension will be continually recycling back to the tank 20 as long as the liquid level in the feed tank 5 is above the open upper end of the pipe 5'. The desired amount of the previously formed emulsion is delivered to the blunger from the storage tank 13, by means of pipe 23, and pump 24, the pipe 23 having suitable control valve 25.

It may be noted that by recycling emulsion in the manner described, the resulting product of the subsequent emulsifying operations is more finely dispersed.

I claim as my invention:

1. In an apparatus for making emulsions, the combination with a mixing chamber having agitating elements in which is produced an aqueous colloidal suspension, of an emulsifier separate from the mixing chamber but connected thereto, a supply chamber for the colloidal suspension separate from the mixing chamber, means for delivering such suspension from the mixing chamber to said supply chamber, means for delivering controlled quantities of such suspension from the supply chamber to the emulsifier, and means for feeding a fusible waterproofing material to said emulsifier.

2. In an apparatus for making emulsions, the combination with a mixing chamber in which is produced an aqueous colloidal suspension, of a bulk supply tank for receiving said suspension, a supply box, communications between said bulk supply tank and said supply box, an emulsifier, connections between said supply box and emulsifier, and means for feeding a waterproofing agent to said emulsifier.

3. In an apparatus for making emulsions, the combination with a mixing chamber for producing an aqueous colloidal suspension, of a bulk supply tank for receiving said suspension, a supply box, connections between said bulk supply tank and said supply box, an emulsifier, connections between said supply box and emulsifier, means for feeding a waterproofing agent to said emulsifier, and means for feeding regulated quantities of previously formed emulsions to said mixing chamber.

4. In an apparatus for making emulsions, the combination with a mixing receptacle in which is produced an aqueous colloidal suspension, of an emulsifier, connections between the emulsifier and the mixing receptacle, means for feeding regulated quantities of such suspension to said emulsifier, means for feeding waterproofing material to said emulsifier, and means for delivering regulated quantities of previously prepared emulsion to said mixing chamber.

5. In apparatus for making emulsions, the combination with a mixing chamber having agitating elements in which is produced an aqueous colloidal suspension, of an emulsifier separate from the mixing chamber but connected thereto, a bulk supply chamber for the colloidal suspension separate from the mixing chamber, means for delivering such suspension from the mixing chamber to said bulk supply chamber, means for delivering controlled quantities of such suspension from the bulk supply chamber to the emulsifier, means for feeding a fusible waterproofing material to said emulsifier, a discharge from said emulsifier, an emulsion bulk supply storage tank communicating with said emulsifier discharge, and a communication between the emulsion storage tank and the mixing chamber in which the aqueous colloidal suspension is produced.

6. In an apparatus for making emulsions, the combination with a mixing chamber having agitating elements in which is produced an aqueous suspension containing colloidal matter, of an emulsifier separate from the mixing chamber but connected thereto, a supply chamber for the colloidal suspension separate from the mixing chamber, means associated with said supply chamber whereby a constant head of the suspension is maintained therein, means for delivering a measured supply of such suspension from the supply chamber to the emulsifier and means for feeding a fusible water-proofing material to said emulsifier.

LESTER KIRSCHBRAUN.